Patented Sept. 2, 1924.

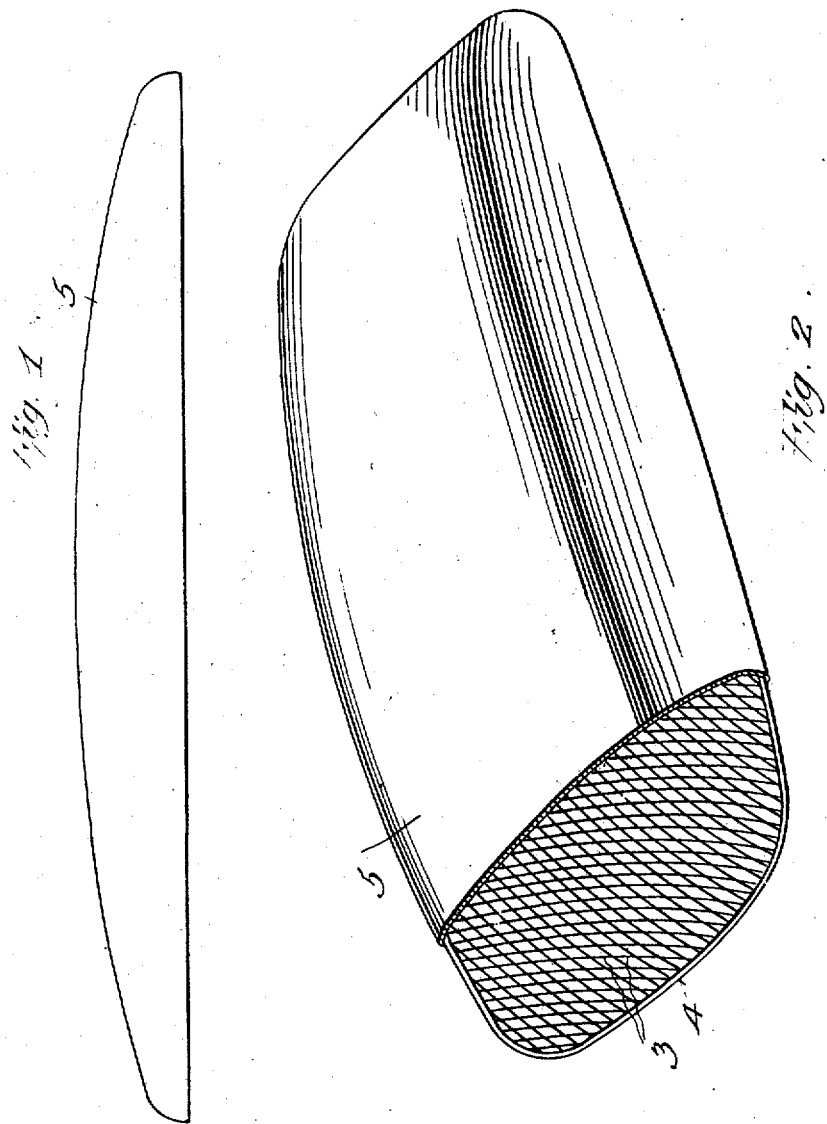

1,506,845

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMOBILE TOP OR ROOF.

Application filed May 8, 1919. Serial No. 295,532.

*To all whom it may concern:*

Be it known that I, JOSEPH LEDWINKA, a citizen of the United States, residing at Philadelphia, in the county of Philadelphia, State of Pennsylvania, have made a certain new and useful Invention in Automobile Tops or Roofs, of which the following is a specification.

This invention relates to automobile roofs or tops for automobiles or other vehicles.

The further object of the invention is to provide a top or roof structure for automobiles and other vehicles which is simple in structure, economical to manufacture, and light in weight, easily handled and applied.

A further object of the invention is to provide a unitary structure shaped both longitudinally and transversely to the desired contour to form a self-sustained roof for automobiles or other vehicles.

A further object of the invention is to provide a roof structure of the character referred to which does not develop an objectionable noise or hum when the vehicle is operated.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

In the drawing,—

Fig. 1 is a view in side elevation of a top or roof for an automobile or other vehicle constructed in accordance with my invention.

Fig. 2 is a perspective view of the same, a portion of the top or covering removed.

It is a common practice in the automobile manufacturing art to construct the roofs of automobiles and other vehicles of the limousine or winter top type of wood or wooden strips to which a covering of leather or other material is applied. A wooden top or roof is expensive to make, consumes time in the manufacture thereof in the handling and assembling of the various parts, and, moreover, is not as strong and durable as a metallic roof or top. It has heretofore been proposed to form the roof or top of a sheet metal stamping. Experience, however, has shown that a sheet metal roof or top is heavy and develops an undesirable noise or hum when the vehicle is being operated, particularly over rough roads, through the vibrations thereby set up in the roof or top sheet metal stamping. It is among the special purposes of my present invention to avoid these objections and to provide a light, strong and durable top or roof structure for automobiles and other vehicles, wherein in place of the wooden and sheet metal stamping structures heretofore employed I use a wire screen or foraminated or reticulated top or roof structure. This roof structure further offers the special advantage, not only of being sufficiently rigid to be self supporting, but makes it possible to form a complete supporting frame in one operation, which can be dipped and enameled or baked as a unitary structure at a great saving of time and expense.

The enameling may be done by dipping the shaped roof structure into an enameling mixture, or by otherwise applying it, after which it is baked at a suitable temperature to form a smooth and firm coating, which gives additional rigidity and a very desirable finish.

In carrying out my invention a foraminous, reticulated or wire screen body 3 is stamped or pressed into the desired shape and contour to form a complete roof structure or top. If desired, the screen body may be provided with a suitable border or rim 4. To the roof or top stamped out, shaped and formed as above described, a top or covering 5 of leather, canvas or other suitable material is applied.

By this construction I secure an exceedingly light, simple, strong and effective top or roof which can be easily and quickly manufactured from any ordinary wire netting or screening of the desired weight and thickness, and which does not develop the objectionable vibration, hum and noise incident to the use of sheet metal stamped tops or roofs.

Having now set forth the objects and nature of my invention, and a construction embodying the principles thereof, what I claim as new and useful, and of my own invention, and desire to secure by Letters Patent is,—

1. A unitary self-sustained roof structure for automobile bodies, comprising a reticulated metallic supporting body having a metallic border rim, and pressed into the desired longitudinal and transverse shape and contour, and having a cover applied thereto.

2. A roof for automobiles and other vehicles comprising a foraminous, reticulated or screen body pressed into the required longitudinal and transverse shape and contour to form a unitary structure, and a cover applied to said structure.

3. A roof for automobiles and other vehicles comprising a foraminous, reticulated or screen body pressed into the required longitudinal and transverse shape and contour to form a unitary structure, and a binder frame applied to the edge of said structure.

4. A unitary roof structure for automobiles and other vehicles, comprising a foraminous, reticulated metallic body portion and a metallic border rim, said body portion having extended length to extend over the body of the automobile or vehicle as a roof therefor, and pressed into the desired shape and contour in the direction of length thereof as well as transversely.

In testimony whereof I have hereunto set my hand on this 30th day of April, A. D., 1919.

JOSEPH LEDWINKA.